US006386344B1

(12) United States Patent
Hershtik

(10) Patent No.: US 6,386,344 B1
(45) Date of Patent: May 14, 2002

(54) BRAKING DEVICE

(76) Inventor: Arie Hershtik, 24 HaGvura HaYehudit Street, Rishon LeZion (IL), 75281

(*) Notice: Subject to any disclaimer, the term of this patent is extended or adjusted under 35 U.S.C. 154(b) by 0 days.

(21) Appl. No.: 09/554,292

(22) PCT Filed: Nov. 5, 1998

(86) PCT No.: PCT/IL98/00539

§ 371 Date: May 9, 2000

§ 102(e) Date: May 9, 2000

(87) PCT Pub. No.: WO99/24118

PCT Pub. Date: May 20, 1999

(30) Foreign Application Priority Data

Nov. 11, 1997 (IL) ........................................ 122165
Nov. 5, 1998 (IL) ........................................ PCT/IL98/00539

(51) Int. Cl.[7] ........................................ F16F 9/30
(52) U.S. Cl. ........................ 188/268; 188/185; 188/180; 188/186; 188/290
(58) Field of Search ........................ 188/65.1, 65.5, 188/64, 180, 184, 186, 187, 188, 268, 290, 185; 182/233, 234, 238, 239

(56) References Cited

U.S. PATENT DOCUMENTS

| | | | | |
|---|---|---|---|---|
| 286,306 A | * 10/1883 | Johnson | | 188/184 |
| 1,001,065 A | * 8/1911 | Mursch | | 188/290 |
| 1,206,676 A | * 11/1916 | Cote | | 182/239 |
| 2,362,676 A | * 11/1944 | Stechbart | | 188/187 |
| 2,937,853 A | * 5/1960 | Jackson, Jr. | | 188/187 |
| 4,011,929 A | * 3/1977 | Jeram et al. | | 188/268 |
| 4,448,284 A | 5/1984 | Ciabo | | |
| 4,480,716 A | * 11/1984 | Soubry et al. | | 182/233 |
| 4,523,664 A | * 6/1985 | Soubry et al. | | 182/233 |
| 5,083,633 A | * 1/1992 | Seeger | | 182/238 |
| 5,186,289 A | 2/1993 | Wolner et al. | | |

FOREIGN PATENT DOCUMENTS

| | | |
|---|---|---|
| BR | 8701130 | 2/1987 |
| DE | 2748904 | 5/1979 |
| GB | 2291944 | 7/1996 |
| NL | 8004667 | 3/1982 |
| NL | 9401422 | 1/1996 |
| PT | 77995 | 1/1984 |
| SU | 1005798 | 12/1981 |
| SU | 1430031 | 10/1988 |
| WO | WO 95/07733 | 3/1995 |

* cited by examiner

*Primary Examiner*—Christopher P. Schwartz
*Assistant Examiner*—Thomas Williams
(74) *Attorney, Agent, or Firm*—Dekel Patent Ltd.; David Klein

(57) ABSTRACT

A braking device including a chamber rotatably mounted on an axle, the chamber defining an inner cavity, a disc mounted on the axle in the inner cavity, the disc having opposing surfaces extending away from the axle, and a pourable material disposed in the inner cavity such that rotation of the chamber imparts a centrifugal force to the material, causing the material to be wedged between an inner surface of the inner cavity and the opposing faces so as to apply a braking force to the disc.

12 Claims, 3 Drawing Sheets

BRAKING DEVICE

FIELD OF THE INVENTION

The present invention relates generally to vertical descent rescue apparatus and particularly to a braking device for a vertical descent rescue apparatus that employs a pourable material that applies a braking force when a centrifugal force is applied to the pourable material.

BACKGROUND OF THE INVENTION

Vertical descent rescue devices are well known in the art. These devices basically comprise some type of seat or belt for supporting a person, the seat or belt being attached to a reel from which a cable may be spooled. In an emergency situation requiring rapid evacuation from a tall building, a person secures himself to the seat/belts and hooks an end of the cable to a sturdy, anchored structure on the building. The person then jumps from the building. As the person descends, a braking mechanism retards the rotation of the cable reel so that the person descends at a safe speed down to the ground.

An example of such a device is described in Dutch Patent 9401422 assigned to Boon Safety CV. This document describes a self-evacuating portable apparatus for use in tall buildings. The apparatus includes a spool containing a line that reels in either direction, together with braking means to limit the line speed. The brakes act upon the line which is made of an aramid material such as TWARON® and KEVLAR®.

Russian Patent 1430031 describes a rescue appliance for lowering. The appliance has support cups integrated with brake discs plus adjustable emergency brake shoes.

Brazilian Patent 8701130 describes automatic gravity-based rescue equipment. The equipment comprises a system with a reeled belt for descent from high buildings and automatic rewinding of the belt.

Portuguese Patent 77995 describes rescue equipment for people trapped in buildings. The equipment comprises safety belts in a double reel and multiple suspension cable assembly.

Russian Patent 1005798 describes a centrifugal braking mechanism for a load lowering unit. The mechanism includes springs of various strengths.

Russian Authors Certificate SU 1005798 describes a centrifugal braking rescue mechanism with a reel that includes a braking disc placed in a braking drum cavity and provided with braking blocks. The mechanism is provided with springs of various stiffnesses for pressing the braking blocks against the braking disc. As the person being rescued is lowered. The cable end moves down and causes reel rotation. The torque from the reel is transmitted to the centrifugal braking mechanism flywheel through a cam clutch and planetary reducer. The braking blocks, due to the centrifugal force, rise to the reel inner surface, overcome the spring force and press against the braking disc.

Dutch Patent 8004667 describes a building emergency rescue cable reel which is stopped or braked during pay-out of the cable by cable tension at least once every revolution to limit the run-off speed.

German Patent Document 2748904 describes a roping down reel for rescue equipment. The rescue equipment has a brake mechanism which engages or releases brakes by turning a crank handle.

U.S. Pat. No. 4,448,284 describes a rescue device with a centrifugal dynamic brake. Brake pads are centrifugally pressed against a brake drum as a rescue cable spools off a rotating reel.

A disadvantage of prior art systems is that an enormous amount of heat is generated by the braking action during descent. This generation of heat can lead to descent speeds above safety thresholds, or worse, to catastrophic failure of the braking mechanism.

SUMMARY OF THE INVENTION

The present invention seeks to provide improved vertical descent rescue apparatus that is safe and reliable, and is unaffected by brake heat generation.

There is thus provided in accordance with a preferred embodiment of the present invention a braking device including a chamber rotatably mounted on an axle. The chamber defining an inner cavity, a disc mounted on the axle in the inner cavity, the disc having opposing, surfaces extending away from the axle, and a pourable material disposed in the inner cavity such that rotation of the chamber imparts a centrifugal force to the material, causing the material to be wedged between an inner surface of the inner cavity and the opposing faces so as to apply a braking force to the disc.

In accordance with a preferred embodiment of the present invention the device also includes a reel mounted about the axle and connected to the chamber, wherein rotation of the reel imparts rotation to the chamber.

Further in accordance with a preferred embodiment of the present invention the reel is connected to the chamber through a gear assembly. Preferably the gear assembly increases rotation of the chamber relative to the reel.

Additionally in accordance with a preferred embodiment of the present invention the device also includes a cable wound around the reel.

In accordance with a preferred embodiment of the present invention the device also includes a support loop secured to an end of the cable.

Further in accordance with a preferred embodiment of the present invention the device also includes an outer housing connected to the axle, the chamber being inside the housing.

Still further in accordance with a preferred embodiment of the present invention at least one handle is attached to an outer surface of the housing.

In accordance with a preferred embodiment of the present invention at least one person-supporting device is attached to an outer surface of the housing.

Further in accordance with a preferred embodiment of the present invention the pourable material may comprise: sand, powdered material, granulated material, or a liquid.

There is also provided in accordance with a preferred embodiment of the present invention a braking device including a chamber rotatably mounted on an axle, the chamber defining an inner cavity, a disc mounted on the axle in the inner cavity, the disc having opposing surfaces extending away from the axle, and a wedge disposed in the inner cavity such that rotation of the chamber imparts a centrifugal force to the material, causing the material to be wedged between an inner surface of the inner cavity and the opposing faces so as to apply a braking force to the disc.

In accordance with a preferred embodiment of the present invention the wedge is lined with a brake pad. Preferably the opposing surfaces are lined with a brake pad.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
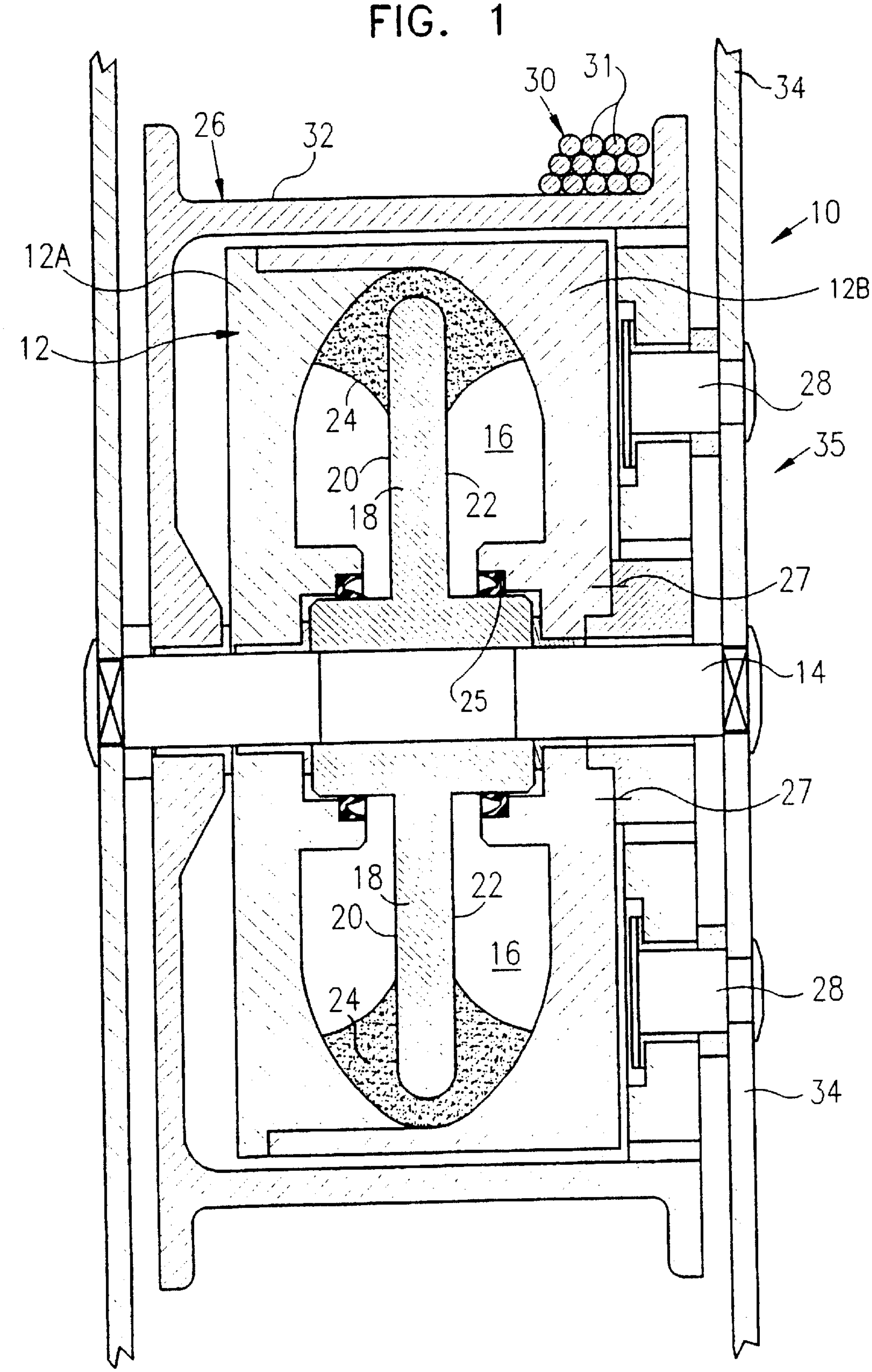
FIG. 1 is a simplified sectional illustration of a braking device constructed and operative in accordance with a preferred embodiment of the present invention.

Reference is now made to FIG. 1 which illustrates a braking device 10 constructed and operative in accordance with a preferred embodiment of the present invention.

Braking device 10 includes a chamber 12 rotatably mounted on an axle 14. Chamber 12 is shown constructed from two halves 12A and 12B, but it is appreciated that any other form of construction may also be used. Chamber 12 has an inner cavity 16. In the illustrated embodiment, inner cavity has somewhat parabolically shaped ends, but any other shape may also be used.

A disc 18 is mounted on axle 14 in inner cavity 16. Disc 18 preferably has two opposing surfaces 20 and 22 extending away from axle 14.

A pourable material 24 is disposed in inner cavity. Pourable material 24 may be any kind of powdered or granulated material, and may even be a liquid. The best mode of carrying out the invention comprises using sand as pourable material 24. Sand can withstand the enormous heat generation during braking without any significant chance in material properties. Pourable material 24 is illustrated in FIG. 1 with a shape imparted thereto during rotation of chamber 12, as will be described hereinbelow. It is of course understood that when chamber 12 is at rest, pourable material 24 merely sits in chamber 12. One or more seals 25 may be provided for sealing pourable material 24 inside inner cavity 16.

A reel 26 is preferably mounted about axle 14 and connected to chamber 12, such as by mechanical fasteners at reference lines 27. Reel 26 is most preferably connected to chamber 12 through a gear assembly 28, comprising one or more reduction gears. Rotation of reel 26 about axle 14 imparts rotation to chamber 12. Gear assembly 28 preferably increases rotation of chamber 12 relative to reel 26. For example, a gear ratio may be selected such that the rotational velocity of chamber 12 is 5 times greater than the rotational velocity of reel 26. A cable 30, comprising as many strands 31 as necessary for safety requirements, is preferably wound around an outer portion 32 of reel 26.

Axle 14 is preferably journaled in an outer housing 34. Chamber 12 is inside housing 34, and the gears of gear assembly 28 are also preferably journaled in housing 34. The assembly of chamber 12, disc 13, axle 14, pourable material 24, housing 34 and cable 30 comprises a rescue device 35.

Figure 2:
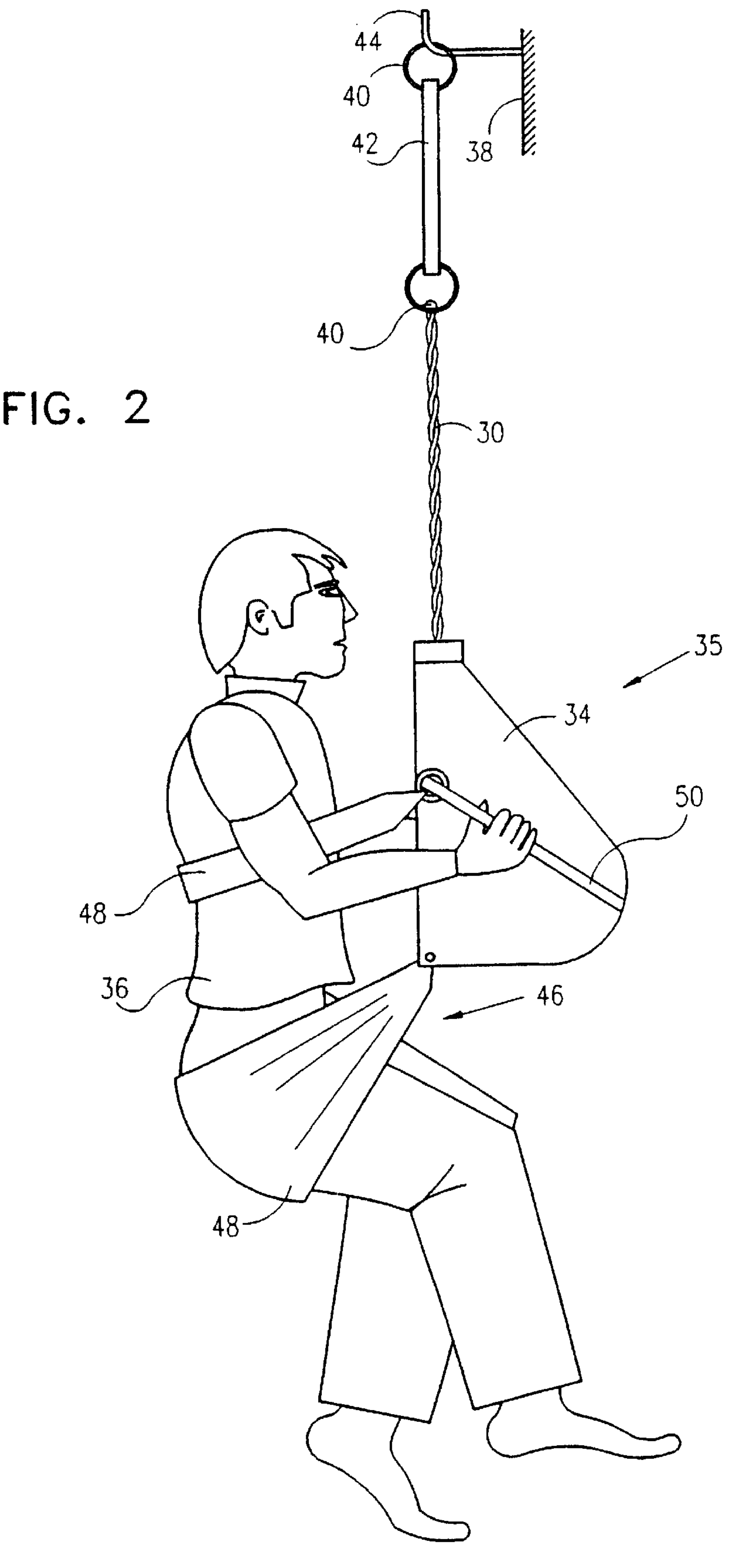
FIG. 2 is a simplified pictorial illustration of a rescue device constructed and operative in accordance with a preferred embodiment of the present invention, comprising therein the braking device of FIG. 1.

Reference is now made to FIG. 2 which illustrates a person 36 using rescue device 35 to descend from a tall building 38. Cable 30 preferably has a support loop 40 secured to an end thereof. Optionally, cable 30 may terminate in a flexible belt 42. In such a case, flexible belt 42 has a support loop 40 secured to an end thereof.

When using rescue device 35, loop 40 is attached to a hook 44 or other structure securely anchored to building 38. Rescue device 35 is preferably provided with one or more person-supporting devices 46, such as straps 48. One or more handles 50 are preferably attached to an outer surface of housing 34. Alternatively, instead of holding on to rescue device 35, person 36 may attach rescue device 35 to hook 44 and descend with cable 30 attached to person-supporting devices 46.

Referring additionally to FIG. 1, as person 36 descends, cable 30 is spooled off reel 26, thereby causing reel 26 to rotate. Rotation of reel 26 causes even faster rotation of chamber 12, via gear assembly 28. Rotation of chamber 12 imparts a centrifugal force to pourable material 24, causing pourable material 24 to be wedged between an inner surface of inner cavity 16 and opposing faces 20 and 22 so as to apply a braking, force to disc 18. Pourable material 24 thus behaves much like brake pads pressing against a disc brake. As mentioned above, pourable material 24 is illustrated in FIG. 1 with the shape imparted thereto during rotation of chamber 12.

Tests have shown that rescue device 35 allows a person to reach a safe descent velocity of under 2.5 m/sec for rescue weights ranging from 1–1000 kg. Pourable material 24 may reach very high temperatures, such as well above 1000° C. during a descent of several hundred meters. Sand used as pourable material 24 effectively polishes surfaces 20 and 22 and the sand may become powdery. Nevertheless, the sand efficiently and safely brakes disc 18. The above values are of course only exemplary, and the present invention is not limited to these values.

Figure 3:
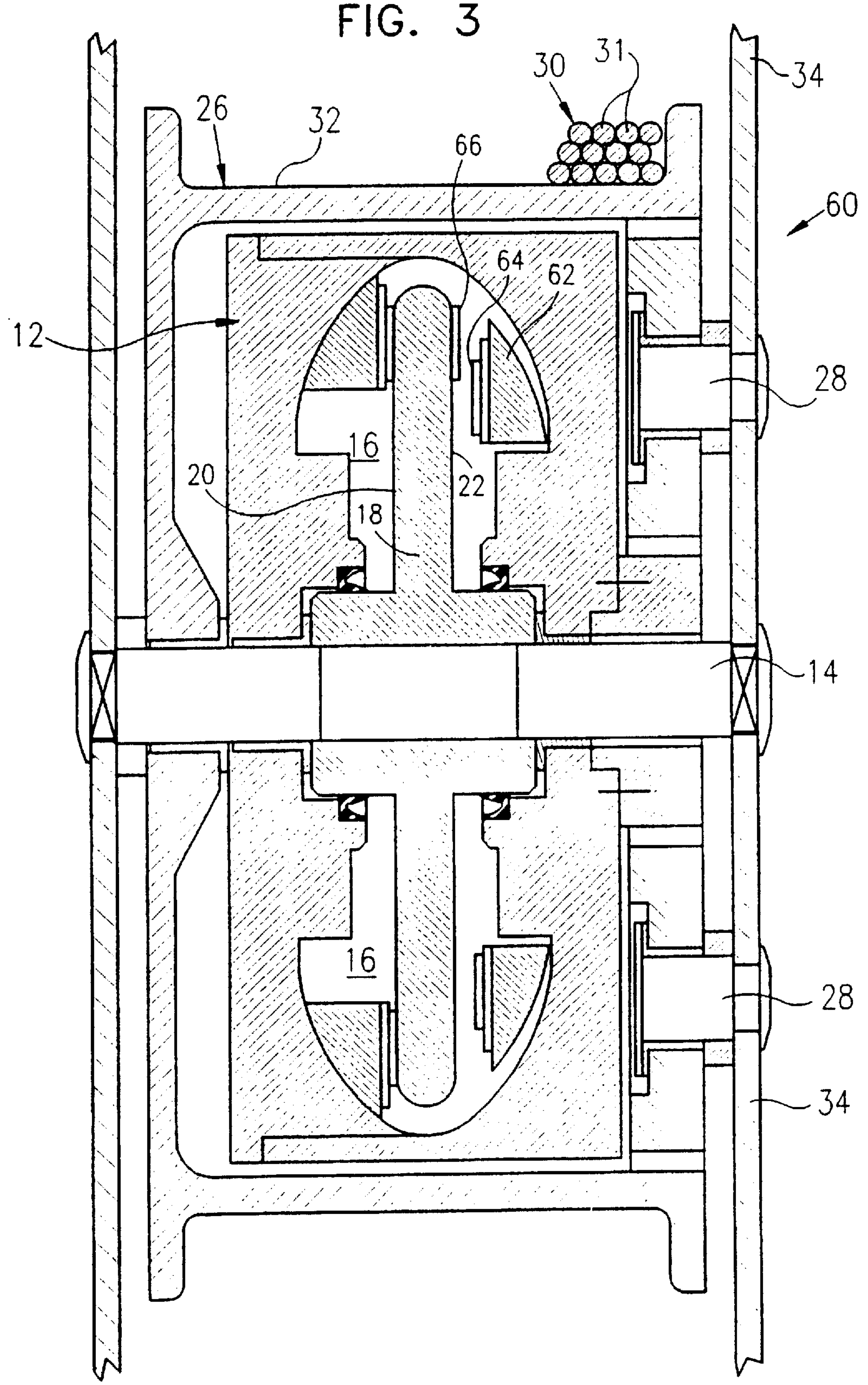
FIG. 3 is a simplified sectional illustration of a braking device constructed and operative in accordance with another preferred embodiment of the present invention.

Reference is now made to FIG. 3 which illustrates a braking device 60 constructed and operative in accordance with another preferred embodiment of the present invention. Braking device 60 is substantially identical to braking device 10 with like elements being designated by like numerals. Braking device 60 differs from braking device 10 in that braking device 60 does not comprise a pourable material, but rather includes one or more wedges 62 freely disposed in inner cavity. Wedge 62 is preferably lined with a brake pad 64. Disc 18 is also preferably lined with a corresponding brake pad 66.

FIG. 3 illustrates one of wedges 62 (on the right side of disc 18) before rotation of reel 26 and chamber 12, and another wedge 62 (on the left side of disc 18) during rotation of reel 26 and chamber 12. As described hereinabove for rescue device 35 with reference to FIG. 2, as person 36 descends, cable 30 is spooled off reel 26, thereby causing reel 26 to rotate. Rotation of reel 26 causes even faster rotation of chamber 12, via gear assembly 28. Rotation of chamber 12 imparts a centrifugal force to wedges 62, causing wedges 62 to be wedged between an inner surface of inner cavity 16 and brake pads 66 of opposing faces 20 and 22 so that brake pads 64 of wedges 62 apply a braking force to disc 18. It is appreciated that wedges 62 may have any arbitrary outer shape, corresponding to the shape of the inner surface of inner cavity 16.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A braking device comprising:

a chamber rotatably mounted on an axle, said chamber defining an inner cavity;

a disc mounted on said axle in said inner cavity, said disc having opposing surfaces extending away from said axle; and a solid pourable material disposed in said inner cavity such that rotation of said chamber imparts a centrifugal force to said material, causing said material to be wedged between an inner surface of said inner cavity and said opposing surfaces so as to apply a braking force to said disc;

wherein said pourable material is selected from a group consisting of: sand, powdered material and granulated material.

2. The braking device according to claim 1 and comprising a reel mounted about said axle and connected to said chamber, wherein rotation of said reel imparts rotation to said chamber.

3. A braking device comprising:

a chamber rotatably mounted on an axle, said chamber defining an inner cavity;

a disc mounted on said axle in said inner cavity, said disc having opposing surfaces extending away from said axle;

a pourable material disposed in said inner cavity such that rotation of said chamber imparts a centrifugal force to said material, causing said material to be wedged between an inner surface of said inner cavity and said opposing faces so as to apply a braking force to said disc; and, a reel mounted about said axle and connected to said chamber, wherein rotation of said reel imparts rotation to said chamber;

wherein said reel is connected to said chamber through a gear assembly.

4. The braking device according to claim 3 and wherein said gear assembly increases rotation of said chamber relative to said reel.

5. The braking device according to claim 3 and comprising a cable wound around said reel.

6. The braking device according to claim 5 and comprising a support loop secured to an end of said cable.

7. The braking device according to claim 3 and comprising an outer housing connected to said axle, said chamber being inside said housing.

8. The braking device according to claim 7 and wherein at least one handle is attached to an outer surface of said housing.

9. The braking device according to claim 7 and wherein at least one person-supporting device is attached to an outer surface of said housing.

10. A braking device comprising:

a chamber rotatably mounted on an axle, said chamber defining an inner cavity;

a disc mounted on said axle in said inner cavity, said disc having opposing surfaces extending away from said axle; and a wedge disposed in said inner cavity such that rotation of said chamber imparts a centrifugal force to said wedge, causing said wedge to be wedged between an inner surface of said inner cavity and said opposing surfaces so as to apply a braking force to said disc.

11. A braking device according to claim 10 wherein said wedge is lined with a brake pad.

12. A braking device according to claim 10 wherein said opposing surfaces are lined with a brake pad.

* * * * *